(12) United States Patent
McGuire et al.

(10) Patent No.: US 10,061,183 B1
(45) Date of Patent: Aug. 28, 2018

(54) IMAGE CAPTURE ASSEMBLY

(71) Applicant: Amazon Technologies, Inc., Seattle, WA (US)

(72) Inventors: Jonathan G. McGuire, Seattle, WA (US); Brent George, Puyallup, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/288,822

(22) Filed: Oct. 7, 2016

(51) Int. Cl.
*G03B 15/06* (2006.01)

(52) U.S. Cl.
CPC ................... *G03B 15/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 569,503 | A * | 10/1896 | Keyes | G02B 5/10 359/851 |
| 4,123,768 | A * | 10/1978 | Kilshaw | G03B 15/00 396/16 |
| 5,758,196 | A * | 5/1998 | Laing | G03B 15/06 135/124 |
| 5,778,258 | A * | 7/1998 | Zamoyski | G03B 15/06 396/2 |
| 9,046,740 | B1 * | 6/2015 | Smithweck | G03B 15/00 |
| 2001/0041064 | A1 * | 11/2001 | Huebner | G03B 15/06 396/3 |

* cited by examiner

*Primary Examiner* — Minh Phan
(74) *Attorney, Agent, or Firm* — Lee & Hayes, PLLC

(57) ABSTRACT

An example assembly includes a top ring, a bottom ring, and a brace connected to the top and bottom rings. The brace spaces the top ring from the bottom ring, such as along a longitudinal axis of the assembly. The assembly further includes a sidewall extending from the top ring to the bottom ring and defining at least part of an interior space of the assembly. The assembly also includes at least one mirror disposed external to the interior space and opposite the sidewall. The mirror is moveable, and is configured to direct ambient light to the interior space via the sidewall.

21 Claims, 5 Drawing Sheets

IMAGE CAPTURE ASSEMBLY

BACKGROUND

The Internet has evolved as a useful tool for the exchange of goods, and various online marketplaces or other websites now enable users to list items for sale with relative ease. As part of this process, a user may capture an image of the item he or she wishes to sell, and may upload the image to the respective website when generating a listing on the website. While existing photo or digital imaging systems may enable a user to capture an image of an item using a smart phone, a digital camera, or other device, such systems are typically not functional in environments where power is unavailable. In particular, such systems generally must be connected to a power supply in order for the light assemblies and/or other components of such systems to operate. If such systems are not connected to a power supply, the resulting images obtained using such systems will be of relatively poor quality. Additionally, since such systems are typically configured to remain stationary during use, such systems do not enable the user to capture images of an item disposed within such systems from different vantage points without repositioning the item.

BRIEF DESCRIPTION OF THE DRAWINGS

This detailed description makes reference to the accompanying figures. In the figures, the left-most digit(s) of a reference number identifies the figure in which the reference number first appears. The same reference numbers in different figures indicate similar or identical items.

DETAILED DESCRIPTION

Figure 1:
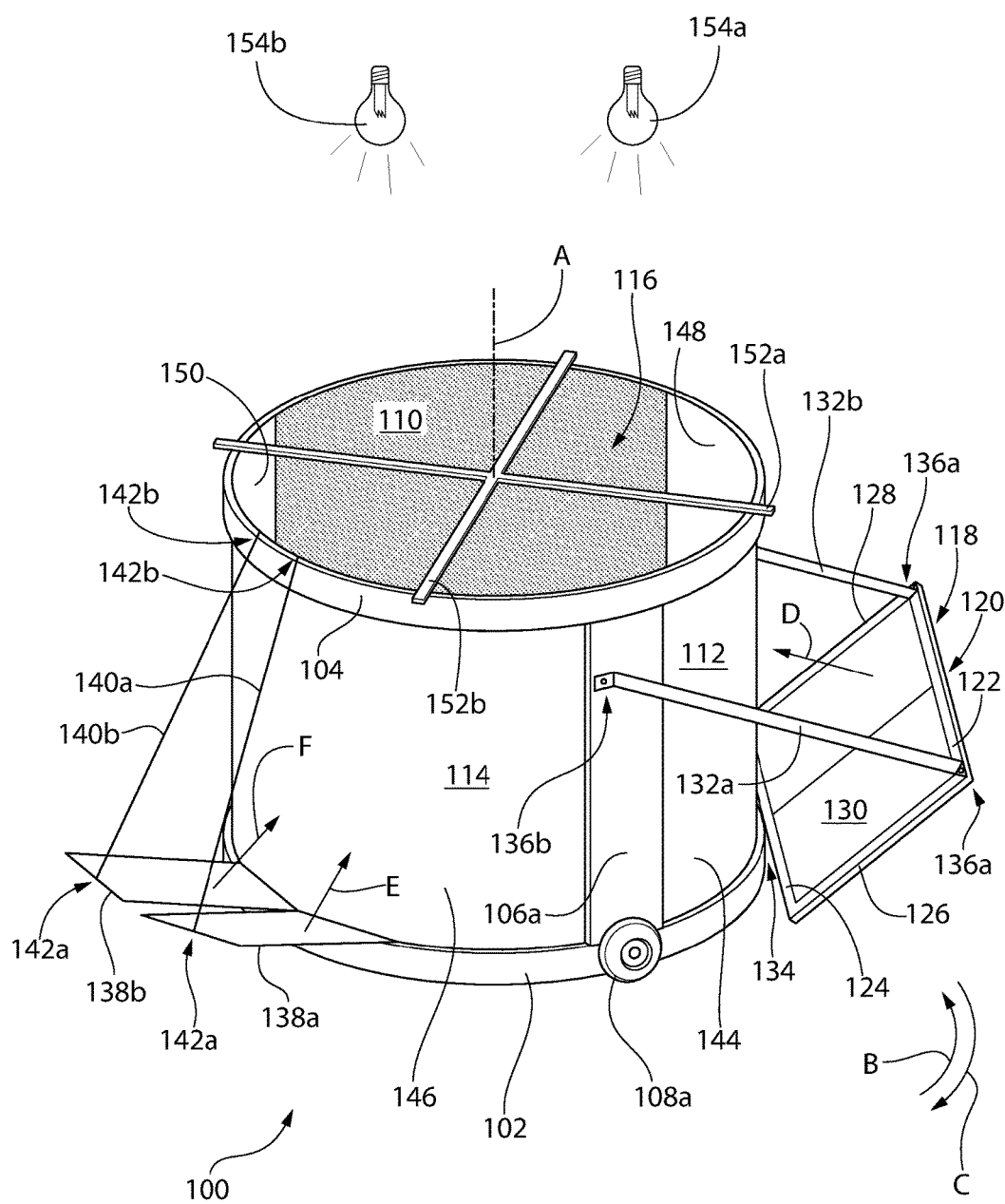
FIG. 1 illustrates an example assembly for capturing an image of an item.

Described herein are systems, assemblies, and methods related to capturing images of an object suitable for use in an online marketplace or other website. The example assemblies of the present disclosure may be configured to enable a user to capture such an image using, for example, a smart phone, a digital camera, a tablet computer, a laptop, and/or other electronic device having image capture capabilities. The assemblies may be shaped, sized, and/or otherwise configured to accept a variety of different items of various shapes, sizes, or dimensions. Additionally, the assemblies of the present disclosure may be configured to illuminate an interior space of the assembly by directing ambient light into the interior space. For example, the assemblies of the present disclosure may include one or more mirrors disposed external to the interior space, and moveable relative to various components of the assembly to direct ambient light to the interior space. In such examples, the use of ambient light to illuminate the interior space, and any items disposed therein, may eliminate the need for additional light assemblies connected to and/or associated with the assemblies of the present disclosure. As a result, the assemblies of the present disclosure may be fully operable without being connected to a power source, and thus, such assemblies may enable users to capture images of items without connecting such assemblies to a power source.

The example assemblies of the present disclosure may also be rotatable and/or otherwise moveable relative to the items disposed within the interior space. For example, such assemblies may include one or more wheels or other components configured to support the assembly when the assembly is disposed on a support surface. Once an item has been disposed within the internal space of the assembly, the user may move the assembly relative to the item, using the wheels, in order to capture images of the item from a variety of different vantage points. As a result, the item, or a collection of items, need not be repositioned within the interior space in order for the user to obtain images of different sides of the item(s).

Further, such assemblies may include one or more layers or components made from semi-transparent or substantially materials. Such materials may assist in diffusing and/or dispersing the ambient light directed to the interior space by the one or more mirrors of the assembly. For example, one or more sidewalls of the assembly may be made from a material that is at least semi-transparent and/or at least semi-diffusive. Additionally or alternatively, one or more sidewalls of the assembly may define an orifice and may include a layer of semi-transparent and/or at least semi-diffusive material overlaying the orifice. In any of the example embodiments described herein, the one or more mirrors of the assembly may direct ambient light to the interior space via the one or more sidewalls. In particular, the one or more mirrors of the assembly may direct ambient light to the interior space via at least one layer of semi-transparent and/or semi-diffusive material. Such materials may disperse the ambient light entering the interior space, and may thereby maximize the illumination capabilities of the assembly. Such materials may also form one or more surfaces of the interior space. Accordingly, such materials or components may be off-white, pure white, silver, and/or any other color desirable for forming a contrasting background for the image being captured. As a result, example assemblies of the present disclosure may facilitate capturing digital images that are substantially free from shadows or other undesirable irregularities. Additionally or alternatively, example assemblies of the present disclosure may reduce and/or substantially eliminate the specular reflection of light within the interior space. Such assemblies may also enable capturing digital images having relatively high levels of clarity, sharpness, brightness, and/or other visual characteristics.

Since the various example assemblies described herein enable users to obtain digital images that are of relatively high quality and that are substantially shadow-free, such images generally do not require further manipulation or processing in order to satisfy the image quality requirements of most online marketplaces or other such websites. In particular, the diffusive materials and other configurations of such assemblies may be configured to reduce and/or substantially eliminate the level of specularity within the interior space and, thus, may facilitate obtaining substantially shadow-free images of items disposed within the interior space of the assembly. As a result, the user may upload and/or use such images without the added cost, time, and inconvenience associated with such additional image processing. Additionally, because such assemblies do not include associated light sources, and since such assemblies may be operated without being connected to a power source, the cost and complexity of manufacturing such assemblies is reduced relative to known photo enclosures or other image capture assemblies.

Referring now to FIG. 1, an example of an assembly 100 for capturing photos or other images of an item is illustrated. The example assembly 100 of FIG. 1 may include a substantially rigid frame. In some examples, the frame may be a one-piece frame made from any of the substantially rigid materials described herein. Alternatively, in other examples, the frame of the assembly 100 comprise two or more substantially rigid components that are welded, bolted, clipped, screwed, adhered, soldered, and/or otherwise connected together to form a substantially rigid support structure. For example, as shown in FIG. 1, an example assembly 100 may include a frame comprising, among other things, a bottom ring 102, a top ring 104, and/or one or more braces 106a, 106b, 106c . . . 106n (referred to collectively herein as "braces 106"). Accordingly, any of the assemblies 100 described herein may include at least one of a bottom ring 102, a top ring 104, and a brace 106. The assembly 100 may also include one or more wheels 108a, 108b, 108c . . . 108n (referred to collectively herein as "wheels 108"), and at least one of the wheels 108 may be connected to the frame of the assembly 100. In some examples, each wheel 108a, 108b, 108c may be connected to one of the bottom ring 102 or one of the braces 106, and the wheels 108 of the assembly 100 may enable movement of the assembly 100, such as rotation of the assembly 100 about, for example, a substantially central longitudinal axis A of the assembly 100 when the assembly 100 is disposed on a support surface (not shown). The assembly 100 may further include one or more sidewalls connected to the frame. For example, one or more sidewalls of the assembly 100 may be connected to at least one of the top ring 104, the bottom ring 102, or a brace 106, and one or more of the sidewalls may extend at least partly between the top and bottom rings 104, 102. For example, as shown in FIG. 1, an example assembly 100 may include a first sidewall 110, a second sidewall 112, and/or a third sidewall 114. In further examples, the assembly 100 may include greater than or less than three sidewalls 110, 112, 114, and one or more such sidewalls 110, 112, 114 may define at least part of a substantially enclosed interior space 116 of the assembly 100. As will be described in greater detail below, example sidewalls 110, 112, 114 of the assembly 100 may have any configuration useful in dispersing, diffusing, reflecting, focusing, collimating, refracting, and/or otherwise affecting light and or other radiation directed to the interior space 116. For example, the assembly 100 may also include one or more mirrors 118 disposed external to the interior space 116 and opposite at least one of the sidewalls 110, 112, 114. Such a mirror 118 may be rotatably and/or otherwise movably connected to at least one of the braces 106. Additionally or alternatively, the mirror 118 may be rotatably and/or otherwise movably connected to at least one of the top ring 104, the bottom ring 102, or other components of the frame. In such examples, the mirror 118 may be configured to direct ambient light and/or other radiation to the interior space 116, such as via one or more of the sidewalls 110, 112, 114. Movement of the mirror 118 may assist in increasing or decreasing an amount of ambient light directed into the interior space 116. Movement of the mirror 118 may also assist in controlling the angle or path of the ambient light as it impinges on at least one of the sidewalls 110, 112, 114, thereby affecting the angle or path at which the ambient light enters the interior space 116.

The bottom ring 102 shown in FIG. 1 may be a substantially rigid annular ring forming at least part of a frame of the assembly 100. For example, the bottom ring 102 may be made from any metal, alloy, plastic, polymer, and/or any other such material, and may be rigid enough to at least partially support the braces 106, the top ring 104, the sidewalls 110, 112, 114, and/or other components of the assembly 100. The bottom ring 102 may have any height, thickness, diameter, circumference, and/or other dimensions useful in forming at least part of the frame of the assembly 100 and assisting in defining at least part of the interior space 116. For example, in some embodiments the bottom ring 102 may have a height between approximately 1 inch and approximately 3 inches. Additionally, in some embodiments, the bottom ring 102 may have a diameter between approximately 2 feet and approximately 3 feet. It is understood, however, that in further examples the height, diameter, and/or other dimensions of the bottom ring 102 may be greater than or less than the ranges noted herein. In any of the example embodiments described herein, the bottom ring 102 may extend substantially parallel to the top ring 104. Additionally, while the bottom ring 102 illustrated in FIG. 1 may be a continuous one-piece construction, in further examples, the bottom ring 102 may comprise two or more separate pieces of material that are hingedly, releasably, and/or removably connected together upon manufacturing of the assembly 100 to form a substantially annular bottom ring 102. In such examples, weldments, hinges, clips, latches, pins, bolts, screws, wing nuts, hook-and-loop connections, and/or any other connection components may be employed to connect such separate pieces of material and/or to form the annular bottom ring 102. In such examples, such connection components may enable the assembly 100 to be at least partially disassembled after use, and/or may facilitate easy transportation and storage of the assembly 100 when the assembly 100 is not in use.

The top ring 104 may have a construction similar to and/or the same as the bottom ring 102. For example, the top ring 104 may be a substantially rigid annular ring forming at least an additional part of the frame of the assembly 100. The top ring 104 may be made from any metal, alloy, plastic, polymer, and/or any other such material, and may be rigid enough to at least partially support the braces 106, the sidewalls 110, 112, 114, and/or other components of the assembly 100. The top ring 104 may have any height, thickness, diameter, circumference, and/or other dimensions useful in forming at least part of the frame of the assembly 100 and assisting in defining at least part of the interior space 116. For example, in some embodiments the top ring 104 may have a height between approximately 1 inch and approximately 3 inches. Additionally, in some embodiments, the top ring 104 may have a diameter between approximately 2 feet and approximately 3 feet. It is understood, however, that in further examples the height, diameter, and/or other dimensions of the top ring 104 may be greater than or less than the ranges noted herein. Additionally, while the top ring 104 illustrated in FIG. 1 may be a continuous one-piece construction, in further examples, the top ring 104 may comprise two or more separate pieces of material that are hingedly, releasably, and/or removably connected together upon manufacturing of the assembly 100 to form a substantially annular top ring 104. In such examples, weldments, hinges, clips, latches, pins, bolts, screws, wing nuts, hook-and-loop connections, and/or any other connection components may be employed to connect such separate pieces of material and/or to form the annular top ring 104. As noted above with respect to the bottom ring 102, such connection components may enable the assembly 100 to be at least partially disassembled after use, and/or may facilitate easy transportation and storage of the assembly 100 when the assembly 100 is not in use.

The braces 106 shown in FIG. 1 may comprise substantially rigid supports and/or other elongated members of the assembly 100 configured to support the top ring 104 above the bottom ring 102. For example, the braces 106 may be made from any metal, alloy, plastic, polymer, and/or any of the other materials noted above with respect to the bottom ring 102 and the top ring 104. The braces 106 may be rigid enough to at least partially support the sidewalls 110, 112, 114, the bottom ring 102, the top ring 104, and/or other components of the assembly 100. The braces 106 may have any length, width, thickness, and/or other dimensions useful in forming at least part of the frame of the assembly 100 and assisting in supporting components of the assembly 100. For example, in some embodiments the braces 106 may have a length in a direction substantially parallel to the longitudinal axis A between approximately 1 foot and approximately 2 feet. Additionally, in some embodiments, the braces 106 may have a width in a direction substantially perpendicular to the longitudinal axis A between approximately 1 inch and approximately 3 inches. It is understood, however, that in further examples the length, width, and/or other dimensions of the braces 106 may be greater than or less than the ranges noted herein. Additionally, in some examples the braces 106 may be welded, soldered, formed integrally with, and/or otherwise permanently connected to the bottom ring 102 and/or the top ring 104. In further examples, on the other hand, the braces 106 may be bolted, screwed, hinged, and/or otherwise releasably or removably connected to the bottom ring 102 and/or the top ring 104. In any of the examples described herein, one or more of the braces 106 may have a substantially planar configuration. Alternatively, in any of the examples described herein, one or more of the braces 106 may have a radius of curvature, as measured radially outwardly from the longitudinal axis A, substantially equal to a corresponding radius of curvature of the bottom ring 102 and/or the top ring 104. In such examples, the one or more braces 106 may mate flush with an outer circumference and/or an inner circumference of the bottom ring 102 and/or the top ring 104.

The assembly 100 may include any number of braces 106. In order to facilitate supporting the top ring 104 above the bottom ring 102, and/or to facilitate forming at least part of the interior space 116. For example, one or more of the braces 106 may be connected to the bottom ring 102 and to the top ring 104, and the one or more braces may space the top ring 104 from the bottom ring 102 along the longitudinal axis A. In this way, one or more of the braces 106, in combination with the top ring 104 and the bottom 102 may form a substantially cylindrical assembly 100. Alternatively, in additional embodiments, assembly 100 may be substantially cube shaped, substantially trapezoidal, substantially bowl-shaped, substantially conical, and/or any other desirable shape. In any of the examples described herein, the various braces 106 of the assembly 100 may be substantially evenly spaced about the circumference of the bottom ring 102 and/or the top ring 104. For example, in embodiments in which the assembly 100 includes first and second braces 106a, 106b, the first and second braces 106a, 106b may be separated by approximately 180° about the circumference of the bottom ring 102 and/or the top ring 104. As a further example, in embodiments in which the assembly 100 includes first, second, and third braces 106a, 106b, 106c, the first, second, and third braces 106a, 106b, 106c may be separated by approximately 120° about the circumference of the bottom ring 102 and/or the top ring 104. Additionally, one or more of the sidewalls 110, 112, 114 included in the assembly 100 may be connected to one or more respective braces 106.

Each of the wheels 108 may be rotatably mounted to at least one of the bottom ring 102 or a respective brace 106 of the assembly 100, and the wheels may be made from plastic, rubber, polymers (e.g., Delrin®), and/or any other material configured to provide a desired degree of friction between the wheels 108 and a support surface on which the assembly 100 is disposed. The wheels 108 may be rotatable relative to, for example, the bottom ring 102, a respective brace 106, and/or any other components of the assembly 100 to which the wheels 108 are connected. In such examples, the wheels 108 may support the assembly 100 such that when the assembly 100 is disposed on a support surface, the wheels 108 contact the support surface and, at the same time, space the bottom ring 102 from the support surface by a desired distance along the longitudinal axis A. Accordingly, the wheels 108 may enable movement of the assembly 100, relative to the support surface, in any desired direction. For example, as noted above, the wheels 108 may enable rotation of the assembly 100 about the longitudinal axis A when the assembly 100 is disposed on such a support surface. Additionally or alternatively, the wheels 108 may enable movement of the assembly 100 in one or more linear and/or substantially linear directions along the support surface.

In example embodiments, the wheels 108 may be connected to at least one of the bottom ring 102 or a respective brace 106 of the assembly 100 in any way so as to facilitate such movement of the assembly 100. For example, in some embodiments a bearing and/or other rotatable component of each respective wheel 108 may be connected to a key, pin, shoulder, extension, and/or other structure of the assembly 100, and such a structure may be connected to the bottom ring 102 or the respective brace 106. In such examples, each respective wheel 108 may be rotatable relative to such a key, pin, shoulder, extension, and/or other structure of the assembly 100 in order to facilitate movement of the assembly 100. Further, in examples in which the wheels 108 are configured to facilitate rotation of the assembly 100, each wheel 108 may be rotatable about a respective rotational axis of the wheel 108, and such respective rotational axes may be fixed relative to the assembly 100. In examples in which the wheels 108 are configured to facilitate movement of the assembly 100 in one or more linear or nonlinear directions, on the other hand, the key, pin, shoulder, extension, and/or other structure of the assembly 100 connected to each respective wheel 108 may provide the wheels 108 with varying degrees of freedom. For example, such structures may enable one or more of the wheels 108 to be pivotable, relative to the assembly 100, about a pivot axis that is substantially perpendicular to the respective rotational axes the wheels 108 described above. Enabling the wheels 108 to pivot in this way may facilitate such linear or nonlinear movement of the assembly 100.

Example assemblies 100 of the present disclosure may include any number of sidewalls useful in forming at least part of the interior space 116. For example, in some embodiments the assembly 100 may include a single sidewall extending substantially the entire inner circumferences of the bottom and top rings 102, 104. In further embodiments, such as the embodiment shown in at least FIG. 1, the assembly 100 may include more than one sidewall defining at least part of the interior space 116. In such examples, two or more of the sidewalls may have substantially the same shape, size, material makeup, and/or other configuration. Further, in some examples, one or more of the sidewalls included in the assembly 100 may extend between the bottom ring 102 and the top ring 104. For example, one or more of the sidewalls 110, 112, 114 described herein may have a length, in a direction substantially parallel to the longitudinal axis A, that is less than, greater than, or substantially equal to a vertical distance between a top of the top ring 104 and a bottom of the bottom ring 102. For example, in some embodiments one or more of the sidewalls 110, 112, 114 may have a length in a direction substantially parallel to the longitudinal axis A between approximately 1 foot and approximately 2 feet. It is understood, however, that in further examples the length and/or other dimensions of the one or more of the sidewalls 110, 112, 114 may be greater than or less than the ranges noted herein. Additionally, at least one of the sidewalls 110, 112, 114 may be curved, and such a curved sidewall may have a radius of curvature, as measured radially outwardly from the longitudinal axis A, substantially equal to a corresponding radius of curvature of the bottom ring 102 and/or the top ring 104. Example curved sidewalls 110, 112, 114 are illustrated in FIG. 1.

The sidewall 110 may be made from any durable material configured to form an outer surface or an inner surface of the assembly 100. In some examples, the material used to form the sidewall 110 may be substantially rigid. Alternatively, at least a portion of the sidewall 110 may be substantially flexible to allow for bending, flexing, folding, curving, and/or other movement of the sidewall 110 relative to, for example, the bottom and/or top ring 102, 104. In example embodiments, one or more plastics, polymers, synthetic materials, foams, or other such material may be utilized to form the sidewall 110. Such materials may include any of a variety of utility fabrics or materials such as, for example, Kevlar®, polytetrafluoroethylene, nylon, polypropylene, polyester, denier fabric, polystyrene, Mylar®, and the like. Alternatively, the sidewall 110 may comprise a single sheet of extruded, blown, or thermoformed foam or other material. Additionally or alternatively, at least part of the sidewall 110 may have a substantially corrugated, substantially fluted, and/or other configuration designed to provide greater structural rigidity than, for example, a non-corrugated or non-fluted sidewall 110 made from the same material.

Figure 2:
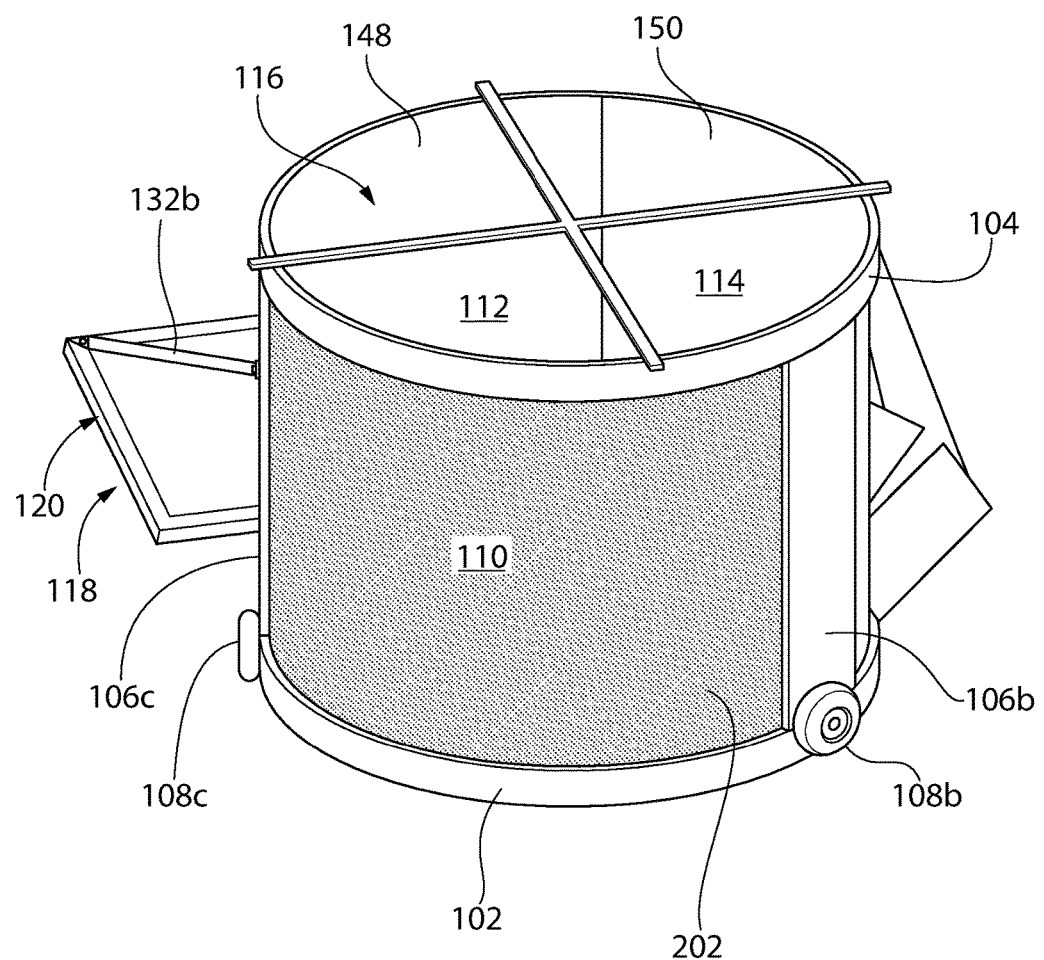
FIG. 2 illustrates a side view of the example assembly shown in FIG. 1.

In any of the examples described herein, the sidewall 110 may have a substantially one-piece (e.g., single layer) construction or, alternatively, the sidewall 110 may include two or more layers that are adhered, heat sealed, thermoformed, co-extruded, molded, and/or otherwise connected together to form a single sheet. In examples in which the sidewall 110 comprises a one-piece (e.g., single layer) construction, the sidewall 110 may be made from any of the materials described above, and may be substantially opaque. In such examples, the sidewall 110 may substantially prohibit ambient light from passing therethrough from a location external to the assembly 100 into the internal space 116. In such examples, the sidewall 110 may be black, gray, and/or any other color configured to assist in substantially prohibiting ambient light from passing therethrough and/or to assist in at least partially absorbing light impinging upon the sidewall 110. In some examples, at least one of an outer surface 202 (FIG. 2) or an inner surface 302 (FIG. 3) of the sidewall 110 may be black, gray, and/or any other such color. In further examples, the outer surface 202, the inner surface 302, and/or the entire sidewall 110 may be such a color.

In examples in which the sidewall 110 includes two or more layers, a first layer of the sidewall 110 (e.g., an outer layer forming the outer surface 202) may be made from any of the materials described above, and may be substantially opaque or semi-transparent. Additionally, a second layer of the sidewall 110 (e.g., an inner layer forming the inner surface 302) may be made from any of the materials described above, and may be substantially opaque. In such examples, at least the inner layer of the sidewall 110 may substantially prohibit ambient light from passing therethrough from a location external to the assembly 100 into the internal space 116. In such examples, at least the inner layer of the sidewall 110 may be black, gray, and/or any other color configured to assist in substantially prohibiting ambient light from passing therethrough and/or to assist in at least partially absorbing light impinging upon the sidewall 110.

At least one of the remaining sidewalls 112, 114 may have substantially the same shape, size, composition, color, and/or other configurations of the sidewall 110. Alternatively, at least one of the remaining sidewalls 112, 114 may have a different shape, size, composition, color, and/or other configuration from the sidewall 110. For example, in some embodiments, the sidewall 110 may be substantially opaque, while at least one of the remaining sidewalls 112, 114 may be semi-transparent. Additionally, as noted above, the sidewall 110 may be black or grey in color to assist in substantially prohibiting ambient light from passing therethrough and/or to assist in at least partially absorbing light impinging upon the sidewall 110. In such embodiments, at least one of the remaining sidewalls 112, 114 may be white, off-white, beige, and/or any other color to assist in permitting passage of ambient light impinging upon the at least one sidewall 112, 114 to the interior space 116, and/or to assist in dispersing such light as the light is directed to the interior space 116 via the at least one sidewall 112, 114. Such remaining sidewalls 112, 114 may also be at least semi-transparent, at least partially reflective, and/or configured to at least partially diffuse light. As a result, the remaining sidewalls 112, 114 may be configured to reduce and/or substantially eliminate specular reflection of ambient light and/or other radiation within the interior space 116. By minimizing and/or substantially eliminating specularity, the images captured using the assembly 100 may be substantially shadow-free and/or otherwise substantially free from imperfections, and/or other irregularities. As will be described in greater detail below, at least one of the remaining sidewalls 112, 114 may have either a substantially one-piece (e.g., single layer) construction or, alternatively, at least one of the remaining sidewalls 112, 114 may include two or more layers that are adhered, heat sealed, thermoformed, co-extruded, molded, and/or otherwise connected together to form a single sheet. Either such configuration may further assist the at least one sidewall 112, 114 in, for example, permitting passage of ambient light to the interior space 116 and/or dispersing such light as the light passes to the interior space 116.

For example, at least one of the remaining sidewalls 112, 114 may be made from any durable material configured to form an outer surface or an inner surface of the assembly 100. In some examples, the material used to form at least one of the remaining sidewalls 112, 114 may be substantially rigid. Alternatively, at least a portion of at least one of the remaining sidewalls 112, 114 may be substantially flexible to allow for bending, flexing, folding, curving, and/or other movement of the at least one sidewall 112, 114 relative to, for example, the bottom and/or top ring 102, 104. In example embodiments, one or more plastics, polymers, synthetic materials, foams, or other such material may be utilized to form at least one of the remaining sidewalls 112, 114. Such materials may include any of the fabrics, foams, or materials described above with respect to the sidewall 110. Additionally or alternatively, at least part of at least one of the remaining sidewalls 112, 114 may have a substantially corrugated, substantially fluted, and/or other configuration designed to provide greater structural rigidity than, for example, a non-corrugated or non-fluted sidewall made from the same material.

The mirror 118 may have any shape, size, construction, and/or other configuration useful in directing ambient light into the interior space 116 from a location external to the interior space 116 and/or external to the assembly 100. For example, as shown in FIG. 1, the mirror 118 may have a substantially flat and/or planar configuration. Alternatively, in other examples, the mirror 118 may have a substantially rounded, substantially curved (e.g., substantially convex or substantially concave), and/or any other configuration to assist in directing ambient light to the interior space 116. Additionally, while the mirror 118 shown in FIG. 1 has a substantially rectangular shape, in other examples, the mirror 118 may be substantially square, substantially oval-shaped, substantially triangular, and/or any other shape. In some examples, the mirror 118 may be made from plastic, glass, polymers, and/or any other substantially reflective materials. Additionally or alternatively, in such examples, at least one surface of the mirror 118 may be coated with a reflective paint and/or other reflective material to provide the mirror 118 with a desired level of reflectivity.

In some examples, the mirror 118 may include a substantially rigid frame 120. For example, the frame 120 may include a top rail 122, extending along at least a portion of a top surface of the mirror 118. The frame 120 may also include a bottom rail 124 opposite the top rail 122 and extending along as at least a portion of a bottom surface of the mirror 118. Additionally, the frame 120 may include a first side rail 126 extending substantially perpendicular to at least one of the top, bottom rails 122, 124. The frame 120 may also include a second side rail 128 opposite the first side rail and extending substantially perpendicular to at least one of the top, bottom rails 122, 124. In such examples, the first side rail 126 may extend along at least a portion of a first side surface of the mirror 118, such as a right-hand side surface of the mirror 118. Additionally, the second side rail 128 may extend along at least a portion of a second side surface of the mirror 118, such as a left-hand side surface of the mirror 118. In any of the examples described herein, the rails 122, 124, 126, 128 may comprise any substantially rigid beam, extension, arm, and/or other structure configured to support at least a portion of mirror 118 during use of the assembly 100. In such examples, one or more of the rails 122, 124, 126, 128 may have a substantially C-shaped, substantially L-shaped, substantially planar, substantially cylindrical, and/or any other configuration useful in supporting the mirror 118, and/or disposing the mirror 118 have any desired location relative to, for example, at least one of the sidewalls 110, 112, 114. The rails 122, 124, 126, 128 described herein may be made from any of the metals, alloys, plastics, polymers, or other materials described above with respect to the bottom ring 102, the top ring 104, and/or the braces 106. One or more of the rails 122, 124, 126, 128 may also include one or more smooth, rounded, and/or otherwise protective outer surfaces configured to shield a user of the assembly 100 from potentially harmful contact with one or more corresponding edges of the mirror 118.

In the examples described herein, the mirror 118 may be pivotable, rotatable, and/or otherwise moveable in any desired direction relative to the longitudinal axis A and/or relative to one or more of the sidewalls 110, 112, 114. Such movement may be, for example, in a direction substantially parallel to, substantially perpendicular to, and/or substantially rotationally about the longitudinal axis A and/or one or more of the sidewalls 110, 112, 114. For example, at least part of the mirror 118 may be rotatable toward the sidewall 112 and/or the longitudinal axis A in the direction of arrow B. At least part of the mirror 118 may also be rotatable away from the sidewall 112 and/or the longitudinal axis A in the direction of arrow C. Such movement may enable the mirror 118 to direct ambient light into the interior space 116, in the direction of arrow D, via at least one of the sidewalls 110, 112, 114, such as the sidewall 112. In such examples, the mirror 118 may reflect such ambient light off of a surface 130 of the mirror 118 at least partly facing at least one of the sidewalls 110, 112, 114. In some examples, the surface 130 may comprise a substantially planar top surface of the mirror 118 and, in other examples, the surface 130 may comprise a substantially planar bottom surface of the mirror 118 disposed opposite and substantially parallel to the top surface of the mirror 118.

In some examples, the assembly 100 may further include at least one extension, arm, or other structure configured to assist in positioning the mirror 118 at any desirable angle or other position relative to the longitudinal axis A and/or one or more of the sidewalls 110, 112, 114 in order to maximize, minimize, and/or otherwise change the amount of ambient light directed to the interior space 116 via at least one of the sidewalls 110, 112, 114. In such examples, such movement of the mirror 118 may also control, change, and/or otherwise affect the path of such ambient light as it impinges upon at least one of the sidewalls 110, 112, 114. For example, the assembly 100 may include one or more arms 132a, 132b (referred to collectively herein as "arms 132") connected to the frame 120. One or more of the arms 132 may have a substantially C-shaped, substantially L-shaped, substantially I-shaped, substantially planar, substantially cylindrical, and/ or any other configuration useful in supporting the mirror 118, and/or disposing the mirror 118 have any desired location relative to, for example, the longitudinal axis A and/or one or more of the sidewalls 110, 112, 114. The arms 132 described herein may be made from any of the metals, alloys, plastics, polymers, or other materials described above with respect to the bottom ring 102, the top ring 104, and/or the braces 106. In some examples, one or more of the arms 132 may comprise a channel having one or more telescoping components configured to pivot, rotate, and/or move the mirror 118 in any desired direction.

Further, the arms 132 may be connected to the frame 120 at any desired location, and in any desired manner, so as to facilitate such movement. For example, one or more of the arms 132 may be fixedly, rotatably, removably, substantially permanently, and/or otherwise connected to an upper portion of the frame 120 to facilitate desired movement of the mirror 118. The assembly 100 may also include one or more hinges, hooks, shelfs, shoulders, clips, pins, screws, bolts, and/or other connection devices 134 disposed opposite the arms 132 and connecting the frame 120 to the bottom ring 102, the top ring 104, and/or at least one of the braces 106. As shown in FIG. 1, in some examples one or more of the arms 132 may be connected to a respective rail of the frame 120. For example, a first arm 132a may be rotatably connected to the first side rail 126 and a second arm 132b may be rotatably connected to the second side rail 128. In such examples, one or both of the side rails 126, 128 may include respective extensions disposed proximate the top rail 122 and configured to facilitate a rotatable and/or otherwise moveable connection between the frame 120 and a respective one of the arms 132. Alternatively, in additional examples one or both the arms 132 may be rotatably and/or otherwise movably connected directly to the top rail 122. In any of the examples described herein, the assembly 100 may include one or more hinges, hooks, shelfs, shoulders, clips, pins, screws, bolts, and/or other connection devices 136a connecting each respective arm 132a, 132b to the frame 120. The assembly 100 may also include one or more hinges, hooks, shelfs, shoulders, clips, pins, screws, bolts, and/or other connection devices 136b connecting each respective arm 132a, 132b to the bottom ring 102, the top ring 104, and/or at least one of the braces 106. While FIG. 1 illustrates the arm 132a being connected to the brace 106a via a connection device 136a, in further examples, the connection devices 136b described herein may moveably connect a respective one of the arms 132 to either the bottom ring 102 or the top ring 104.

In some examples, the assembly 100 may include at least one additional mirror configured to direct additional ambient light to the interior space 116 from a location external to the interior space 116. For example, as shown in FIG. 1, the assembly 100 may include at least one of a first additional mirror 138a and/or a second additional mirror 138b (collectively referred to herein as "additional mirrors 138" or "mirrors 138"). The mirrors 138 may have any shape, size, construction, and/or other configuration useful in directing ambient light into the interior space 116 and at least one of the mirrors 138 may have substantially the same shape, size, reflectivity, and/or other configuration of the mirror 118. For example, at least one of the mirrors 138 may have a substantially flat and/or planar configuration. Alternatively, in other examples, at least one of the mirrors 138 may have a substantially rounded, substantially curved (e.g., substantially convex or substantially concave), and/or any other configuration to assist in directing ambient light to the interior space 116. Additionally, while the mirrors 138 shown in FIG. 1 have a substantially rectangular shape, in other examples, at least one of the mirrors 138 may be substantially square, substantially oval-shaped, substantially triangular, and/or any other shape. In some examples, at least one of the mirrors 138 may be made from plastic, glass, polymers, and/or any other substantially reflective materials. Additionally or alternatively, in such examples, a surface of at least one of the mirrors 138 may be coated with a reflective paint and/or other reflective material to provide at least one of the mirrors 138 with a desired level of reflectivity.

In some examples, at least one of the mirrors 138 may include a substantially rigid frame (not shown) similar to and/or the same as the frame 120 described above. For example, a frame of at least one of the mirrors 138 may include a top rail extending along at least a portion of a top surface of the mirror 138, and a bottom rail opposite the top rail and extending along as at least a portion of a bottom surface of the mirror 138. Additionally, the frame of at least one of the mirrors 138 may include a first side rail extending substantially perpendicular to at least one of the top and bottom rails. The frame may also include a second side rail opposite the first side rail and extending substantially perpendicular to at least one of the top and bottom rails. In such examples, the rails may comprise any substantially rigid beam, extension, arm, and/or other structure configured to support at least a portion of mirror 138 during use of the assembly 100. In such examples, one or more of the rails may have any of the configurations noted above with respect to the rails 122, 124, 126, 128 of the frame 120. For example, such rails may have a substantially C-shaped, substantially L-shaped, substantially planar, substantially cylindrical, and/or any other configuration, and may be made from any of the metals, alloys, plastics, polymers, or other materials described above with respect to the bottom ring 102, the top ring 104, and/or the braces 106.

In the examples described herein, at least one of the mirrors 138 may be pivotable, rotatable, and/or otherwise moveable in any desired direction relative to the longitudinal axis A and/or relative to one or more of the sidewalls 110, 112, 114. Such movement may be, for example, in a direction substantially parallel to, substantially perpendicular to, and/or substantially rotationally about the longitudinal axis A and/or one or more of the sidewalls 110, 112, 114. For example, at least one of the mirrors 138 may be rotatable toward the sidewall 114 and/or the longitudinal axis A in the direction of arrow C, and at least one of the mirrors 138 may also be rotatable away from the sidewall 114 and/or the longitudinal axis A in the direction of arrow B. Such movement may enable the mirrors 138a, 138b to direct ambient light into the interior space 116, in the direction of arrows E and F respectively, via at least one of the sidewalls 110, 112, 114, such as the sidewall 114.

In some examples, the assembly 100 may further include at least one extension, arm, or other structure configured to assist in positioning the respective mirrors 138 at any desirable angle or other position relative to the longitudinal axis A and/or one or more of the sidewalls 110, 112, 114 in order to maximize, minimize, and/or otherwise change the amount of ambient light directed to the interior space 116 via at least one of the sidewalls 110, 112, 114. In such examples, such movement of the respective mirrors 138 may also control, change, and/or otherwise affect the path of such ambient light as it impinges upon at least one of the sidewalls 110, 112, 114. For example, the assembly 100 may include one or more arms 140a, 140b (referred to collectively herein as "arms 140") connected to the frame 120. One or more of the arms 140 may have a substantially C-shaped, substantially L-shaped, substantially I-shaped, substantially planar, substantially cylindrical, and/or any other configuration useful in supporting a respective one of the mirrors 138 and/or disposing a respective one of the mirrors 138 at any desired location relative to, for example, the longitudinal axis A and/or one or more of the sidewalls 110, 112, 114. The arms 140 described herein may be made from any of the metals, alloys, plastics, polymers, or other materials described above with respect to the bottom ring 102, the top ring 104, and/or the braces 106, and such arms 140 may have a configuration that is substantially similar to and/or the same as at least one of the arms 132 described above. In some examples, one or more of the arms 140 may comprise a channel having one or more telescoping components configured to pivot, rotate, and/or move a respective one of the mirrors 138 in any desired direction.

Further, one or more of the arms 140 may be connected a respective one of the mirrors 138 at any desired location, and in any desired manner, so as to facilitate such movement. For example, one or more of the arms 140 may be fixedly, rotatably, removably, substantially permanently, and/or otherwise connected to an upper portion of a respective one of the mirrors 138 to facilitate desired movement of the respective one of the mirrors 138. The assembly 100 may also include one or more hinges, hooks, shelfs, shoulders, clips, pins, screws, bolts, and/or other connection devices 142a connecting one of the arms 140 to a respective one of the mirrors 138. In some examples one or more of the connection devices 142a may connect a respective arm 140a to a respective rail of the frame (not shown) associated with the corresponding mirror 138a. Alternatively, in additional examples one or more of the arms 140 may be rotatably and/or otherwise movably connected directly to a respective one of the mirrors 138. In any of the examples described herein, the assembly 100 may also include one or more hinges, hooks, shelfs, shoulders, clips, pins, screws, bolts, and/or other connection devices 142b connecting each respective arm 140a, 140b to the bottom ring 102, the top ring 104, and/or at least one of the braces 106. While FIG. 1 illustrates the arms 140 being connected to the top ring 104 via respective connection devices 142b, in further examples, the connection devices 142b described herein may moveably connect a respective one of the arms 140 to either the bottom ring 102 or at least one of the braces 106.

As noted above, the mirrors 118, 138 associated with the assembly 100 may be configured to direct ambient light to the interior space 116 from various locations external to the interior space 116, and such ambient light may be directed to the interior space via one or more of the sidewalls 110, 112, 114. In such embodiments, the one or more sidewalls 110, 112, 114 may be configured to assist in directing such ambient light to the interior space 116. For example, as shown in FIG. 1, the sidewalls 112, 114 may include respective outer surfaces 144, 146, and respective inner surfaces 148, 150 opposite the respective outer surfaces 144, 146. In examples in which at least one of the sidewalls 112, 114 comprises a one-piece (e.g., single layer) construction, at least one of the sidewalls 112, 114 may be white, off-white, beige, and/or any other color configured to assist in directing ambient light to the interior space 116 and/or to assist in at least partially dispersing light impinging upon the sidewall 112, 114 as it passes to the interior space 116. In some examples, at least one of the respective outer surfaces 144, 146 or at least one of the respective inner surfaces 148, 150 may be white, off-white, beige, and/or any other such color. In further examples, the respective outer surfaces 144, 146, the respective inner surfaces 148, 150, and/or the entire respective sidewalls 112, 114 may be such a color.

In examples in which at least one of the sidewalls 112, 114 includes two or more layers, a first layer of at least one of the sidewalls 112, 114 (e.g., an outer layer forming the respective outer surface 144, 146) may be made from any of the materials described above, and may be semi-transparent. Additionally, a second layer of at least one of the sidewalls 112, 114 (e.g., an inner layer forming the respective inner surface 148, 150) may be made from any of the materials described above, and may be semi-transparent. In such examples, at least the inner layer forming the respective inner surfaces 148, 150 of the sidewalls 112, 114 may be white, off-white, beige, and/or any other such color configured to assist in substantially directing ambient light to the interior space and/or to assist in at least partially dispersing light impinging upon the respective sidewall 112, 114.

In some examples, the sidewalls 112, 114 and/or at least the respective inner surfaces 148, 150 of the sidewalls 112, 114 may be configured to collimate, diffuse, reflect, refract, filter, focus, and/or otherwise condition light and/or other radiation impinging thereon. Accordingly, in some examples, the inner surfaces 148, 150 may comprise one or more layers of semi-transparent/translucent diffusive material. Such materials may provide a desirable level of collimation, diffusion, reflection, refraction filtering, focusing, reduction, directionality, and/or other conditioning to light or other radiation within the interior space 116. Such materials may be highly reflective and, as a result, may provide adequate light conditions within the interior space 116 for capturing relatively high quality images with only a minimum amount of ambient light entering the interior space 116.

As shown in FIG. 1, the assembly 100 may also include one or more supports 152a, 152b (referred to collectively herein as "supports 152"). At least one of the supports 152 may be configured to assist in positioning and/or supporting one or more structures, such as a top (FIG. 1a), substantially above the interior space 116 and/or the top ring 104. At least one of the supports 152 may be connected to the top ring 104 and/or one or more of the braces 106 to assist in providing such support. For example, one or more of the supports 152 may be fixedly, rotatably, removably, substantially permanently, and/or otherwise connected to the top ring 104 and/or one or more of the braces 106 to facilitate desired movement of the respective one of the supports 152. The assembly 100 may also include one or more hinges, hooks, shelfs, shoulders, clips, pins, screws, bolts, and/or other connection devices connecting at least one of the supports 152 to the top ring 104 and/or one or more of the braces 106. Alternatively, at least one of the supports 152 may contact at least part of the top ring 104 and may extend across at least part of a top surface of the top ring 104 without being directly connected to the top ring 104. In such examples, as shown in FIG. 1, the at least one of the supports 152 may rest on top of the top ring 104 so as to be supported by the top ring 104.

One or more of the supports 152 may have a substantially C-shaped, substantially L-shaped, substantially I-shaped, substantially planar, substantially cylindrical, and/or any other configuration useful in supporting one or more structures substantially above the interior space 116 and/or the top ring 104. The supports 152 described herein may be made from any of the metals, alloys, plastics, polymers, or other materials described above with respect to the bottom ring 102, the top ring 104, and/or the braces 106, and such supports 152 may have a configuration that is substantially similar to and/or the same as at least one of the arms 132 described above. In some examples, one or more of the supports 152 may comprise a channel having one or more telescoping components configured to pivot, rotate, and/or move a respective structure supported by the supports 152 in any desired direction relative to, for example, the longitudinal axis A and/or the top ring 104.

As noted above, at least one of the supports 152 may be configured to assist in positioning and/or supporting one or more structures, such as a top, substantially above the interior space 116 and/or the top ring 104. Such structures may assist in increasing, decreasing, and/or otherwise changing the amount of ambient light directed to the interior space 116 from, for example, one or more light sources 154a, 154b (referred to collectively herein as "light sources 154"). Such light sources 154 may be, for example, the sun, one or more incandescent light bulbs, fluorescent light bulbs, light emitting diodes, and/or other sources of radiation in the visible, ultraviolet, thermal, and/or other wavelength band. In some examples one or more light sources 154 may be disposed external to the interior space 116 at a location, above, to the side, or below the assembly 100.

Figure 1A:
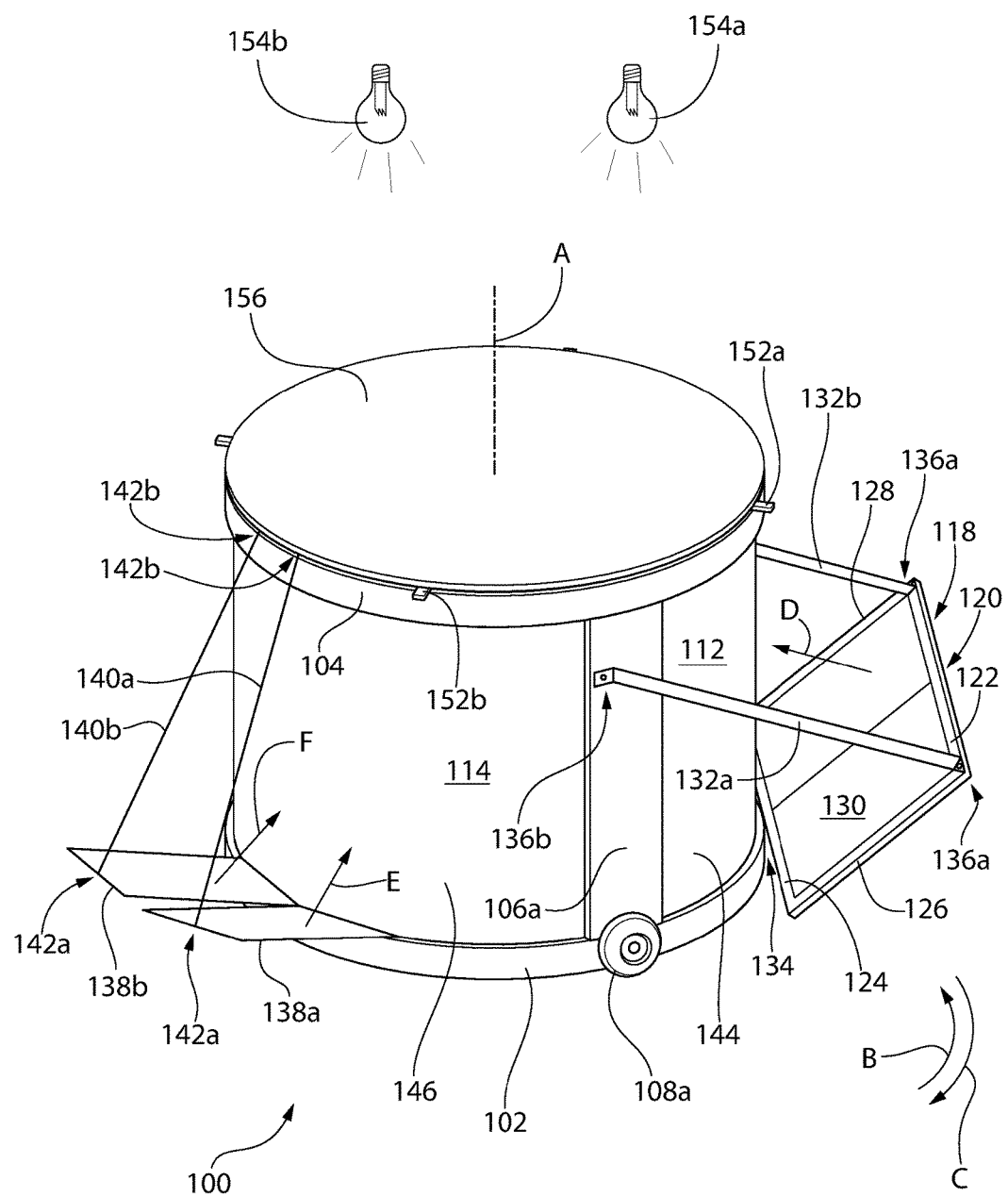
FIG. 1a illustrates the example assembly shown in FIG. 1 including a top disposed thereon.

As shown in FIG. 1a, the assembly 100 may also include a top 156, and in such examples, the top 156 may be removably attached to, disposed on, connected to, and/or supported by one or more of the supports 152a. In examples in which one or more of the light sources 154 is disposed above or to the side of the assembly 100, the top 156 may assist in increasing, decreasing, and/or otherwise changing the amount of ambient light directed to the interior space 116 from one or more of the light sources 154. For example, the top 156 may be configured to block at least a portion of the radiation emitted by one or more of the light sources 154 from entering the interior space 116. The top 156 may also be configured to assist in dispersing ambient light emitted by one or more of the light sources 154 as the light enters the interior space 116 via the top 156.

In the examples described herein, the top 156 may have substantially the same composition, color, and/or other configurations of at least one of the sidewalls 110, 112, 114. For example, in some embodiments the top 156 may be substantially opaque, while in other examples, the top 156 may be semi-transparent. Additionally, the top 156 may be black or grey in color to assist in substantially prohibiting ambient light from passing therethrough and/or to assist in at least partially absorbing light impinging upon the top 156. In other examples, on the other hand, the top 156 may be white, off-white, beige, and/or any other color to assist in permitting passage of ambient light impinging thereon to the interior space 116, and/or to assist in dispersing such light as the light is directed to the interior space 116 via the top 156. Further, similar to the sidewalls 110, 112, 114 described above, the top 156 may have either a substantially one-piece (e.g., single layer) construction or, alternatively, the top 156 may include two or more layers that are adhered, heat sealed, thermoformed, co-extruded, molded, and/or otherwise connected together to form a single sheet. Either such configuration may further assist the top 156 in, for example, permitting passage of ambient light to the interior space 116 and/or dispersing such light as the light passes to the interior space 116.

For example, the top 156 may be made from any durable, substantially rigid material configured to form an outer surface or an inner surface of the assembly 100. In example embodiments, one or more plastics, polymers, synthetic materials, foams, or other such material may be utilized to form the top 156, and such materials may include any of the fabrics, foams, or materials described above with respect to the sidewall 110. Additionally or alternatively, at least part of the top 156 may have a substantially corrugated, substantially fluted, and/or other configuration designed to provide greater structural rigidity than, for example, a non-corrugated or non-fluted structure made from the same material. Further, the top 156 may have any shape, size, or other configuration in order to assist in blocking at least a portion of ambient light impinging thereon, permitting passage of ambient light impinging thereon to the interior space 116, and/or to assist in dispersing such light as the light is directed to the interior space 116. For example, the top 156 may be substantially disc-shaped, substantially square, substantially rectangular, and/or any other shape. In some examples, a substantially disc-shaped top 156 may have a diameter that is less than, greater than, or substantially equal to a diameter of, for example, the top ring 104. Additionally, the top 156 may have a thickness that is between approximately 1/16 inch and approximately ½ inch, and such a thickness may be less than, greater than, or substantially equal to a thickness of at least one of the sidewalls 110, 112, 114.

As described above with respect to at least the sidewalls 112, 114, in some examples a bottom or downward-facing surface of the top 156 (e.g., a surface of the top 156 facing the interior space 116) may form at least part of the interior space 116, and the bottom surface of the top 156 may be configured to collimate, diffuse, reflect, refract, filter, focus, and/or otherwise condition light and/or other radiation impinging thereon. Accordingly, in some examples, the bottom surface of the top 156 may comprise one or more layers of semi-transparent/translucent diffusive material. Such materials may provide a desirable level of collimation, diffusion, reflection, refraction filtering, focusing, reduction, directionality, and/or other conditioning to light or other radiation within the interior space 116. Such materials may be highly reflective and, as a result, may provide adequate light conditions within the interior space 116 for capturing relatively high quality images with only a minimum amount of ambient light entering the interior space 116. In any of the examples described herein, the top 156 may extend substantially perpendicular to the longitudinal axis A, the bottom ring 102, the top ring 104, one or more of the braces 106 and/or one or more of the sidewalls 110, 112, 114.

Figure 3:
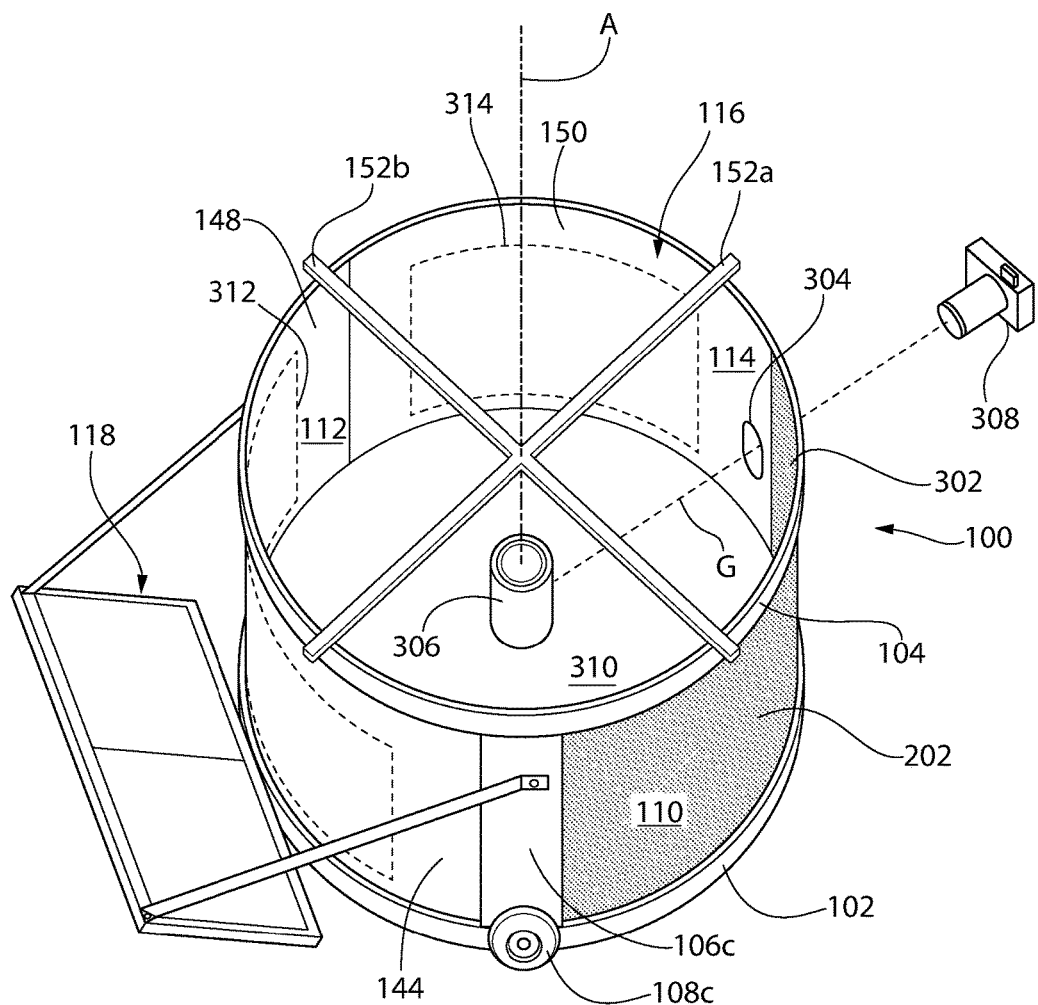
FIG. 3 illustrates a top view of the example assembly shown in FIG. 1.

In further examples, at least one of the sidewalls 110, 112, 114 may include at least one orifice. For example, as shown in FIG. 3, at least one of the sidewalls 112, 114 may include an orifice 304 providing a line of sight G into the interior space 116 from a location external to the interior space 116. Such a line of sight G may enable a user to view, for example, one or more items 306 disposed at least partly within the interior space 116 from the location external to the interior space 116. In some examples, the assembly 100 may also include one or more sheets, layers, covers, or other components (not shown) configured to cover the orifice 304, thereby blocking the line of sight G. For example, in embodiments in which a sidewall 110, 12, 114 having an orifice 304 comprises a substantially one-piece (e.g., single layer) construction, the orifice 304 may comprise a thru-hole extending entirely through the single layer sidewall 110, 12, 114. Similarly, in examples in which the sidewall 110, 12, 114 having an orifice 304 comprises two or more layers that are adhered, heat sealed, thermoformed, co-extruded, molded, and/or otherwise connected together to form a single sheet, the orifice 304 may comprise a thru-hole extending entirely through each layer of the multi-layer sidewall 110, 12, 114.

As noted above, the example assemblies 100 described herein may comprise photo enclosures configured to facilitate capturing images of the various items 306 disposed within the interior space 116. The various structures and/or other components of the assembly 100 may be configured such that images captured using the assembly 100 may be substantially free from shadows, imperfections, and/or other irregularities. In addition, the internal surfaces and/or other structures of the assembly 100 may provide a substantially white background for such images, thereby enhancing the contrast, clarity, brightness, sharpness, and/or other visual characteristics of such images, regardless of the various shapes, sizes, contours, and/or colors of the item 306 being imaged.

Figure 3A:
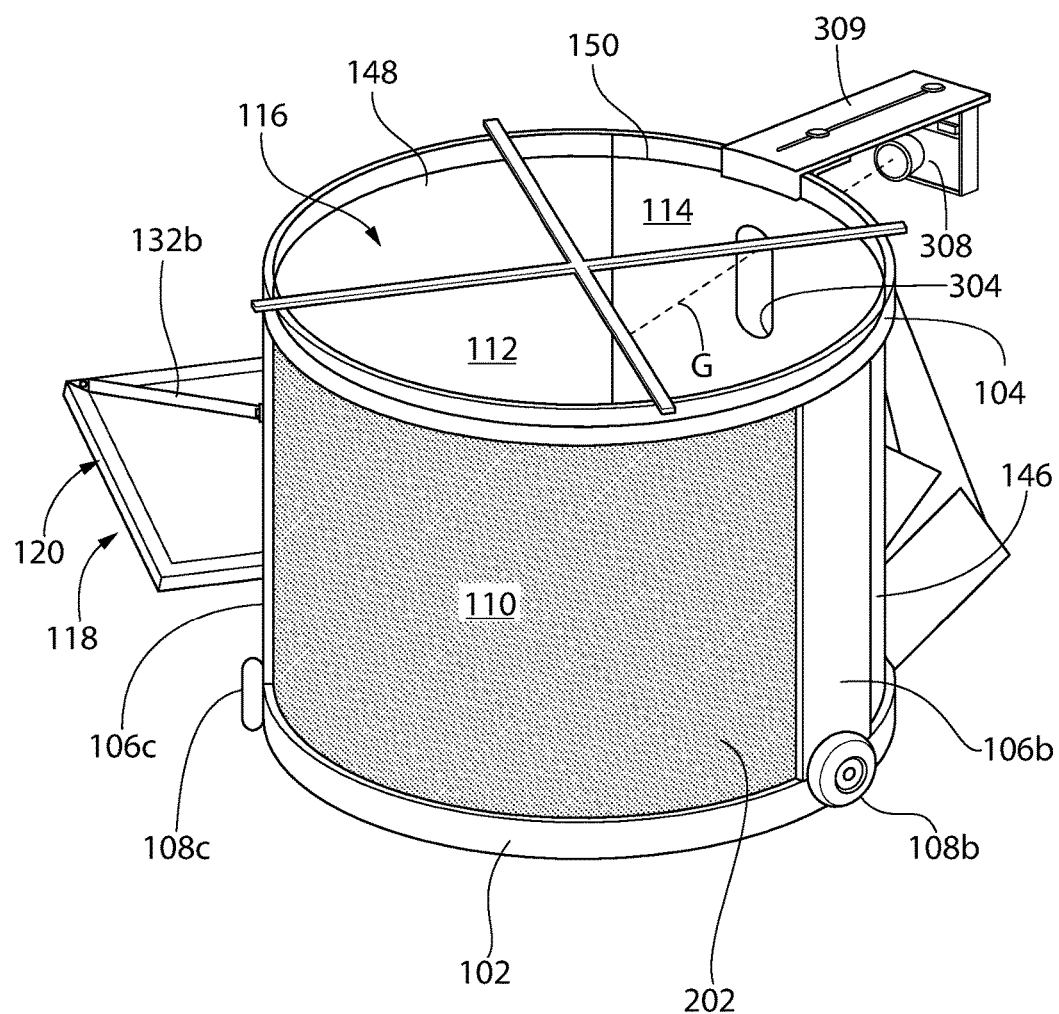
FIG. 3a illustrates another side view of the example assembly shown in FIG. 1 including a component configured to support an imaging device.

As shown in FIG. 3, in some examples an imaging device 308 maybe disposed proximate and/or substantially along the line of sight G, at a location external to the interior space 116 to facilitate capturing one or more images of the item 306. Such an imaging device 38 may be held by a user at the location external to the interior space 116, and the location may be, for example, proximate the orifice 304 and/or substantially adjacent to the outer surface 146 of the sidewall 114. Additionally or alternatively, as shown in FIG. 3a, the assembly 100 may further include one or more brackets, mounts, shelfs, platforms, flanges, or other components 309 configured to support the imaging device 308 while one or more images of the item 306 is captured. For example, such a component 309 may be connected to and/or otherwise supported by at least one of the top ring 104, the bottom ring 102, or one or more of the braces 106, and the imaging device 308 may be supported by and/or removably connected to the component 309 during use of the imaging device 308. Further, such a component 309 may be configured to facilitate movement of the imaging device 308 radially inwardly toward the outer surface 146 of the sidewall 114 and/or radially outwardly away from the outer surface 146. In some examples, such movement may be substantially along, substantially parallel to, and/or at an acute included angle relative to the line of sight G. The component 309 may also be configured to facilitate pivotal, rotational, and/or other movement of the imaging device 308 relative to, for example, the sidewall 114 and/or the longitudinal axis A. In any of the examples described herein, the imaging device 308 may be rotatable and/or otherwise moveable with the assembly 100 when the imaging device 308 is connected to and/or otherwise supported by the component 309.

With continued reference to FIG. 3, the imaging device 308 may comprise, for example, a wireless phone, a tablet computer, a laptop computer, a digital camera, and/or any other device including photo, video, and/or digital imaging functionality. For example, the imaging device 308 may comprise a smart phone having a camera configured to capture video and/or digital images of an item 306 disposed within a field of view of the camera.

In such examples, the imaging device 308 may include one or more processors configured to execute stored instructions and/or to control operation of the camera in response to one or more inputs received from a user of the imaging device 308. The processors may comprise one or more cores, and may be configured to generate one or more user interfaces ("UI") configured to assist the user in operating the camera, capturing an image of an item 306, storing the image, and/or transferring the image from the imaging device 308 to another device and/or location via a network. In some examples, the imaging device 308 may include one or more input/output ("I/O") interface(s) to allow the imaging device 308 to connect to the network and/or to communicate with other devices. The I/O interfaces may comprise inter-integrated circuits ("I2C"), serial peripheral interface buses ("SPI"), universal serial buses ("USB"), RS-232, media device interfaces, and so forth. The imaging device 308 may also include one or more I/O devices such as, for example, one or more displays, keyboards, mice, touchpads, touchscreens, and/or other such components. The one or more displays may be configured to provide visual output to the user. For example, the displays may be connected to the processor(s) of the imaging device 308 and may be configured to render and/or otherwise display content thereon. Such content may include, for example, one or more user interfaces and/or one or more images of the item 306 captured using the camera of the imaging device 308.

The imaging device 308 may also include one or more communication interfaces configured to provide a connection with and facilitate the transfer of data, images, video, files, and/or other information via a network. In such examples, the network may include one or more personal area networks ("PAN"), local area networks ("LAN"), wide area networks ("WAN"), the internet, and so forth. For example, the communications interfaces of the imaging device 308 may include radio modules for a WiFi LAN and a Bluetooth PAN.

The imaging device 308 may also include one or more memories. The memory may comprises one or more non-transitory computer-readable storage media ("CRSM"). The CRSM may comprise one or more of an electronic storage medium, a magnetic storage medium, an optical storage medium, a quantum storage medium, a mechanical computer storage medium and so forth. The memory may provide for storage of computer readable instructions, data structures, program modules, and other data for the operation of the imaging device 308. The memory may be connected to the camera of the imaging device 308 and may also be configured to store data, images, video, files, and/or other information captured by the camera, such as images of an item 306 disposed within the assembly 100.

In some examples, the memory of the imaging device 308 may be fixedly connected to the imaging device 308. Additionally or alternatively, the memory may be removably connected or coupled to the imaging device 308. For example, the imaging device 308 may also include additional data storage devices (removable and/or non-removable) such as, for example, magnetic disks, optical disks, or tape. The additional data storage devices may include volatile and nonvolatile, removable and non-removable media implemented in any method or technology for storage of information, such as computer readable instructions, program modules, data, images, video, files, and/or other information.

As shown in FIG. 3, the assembly 100 may also include a base 310 disposed substantially centrally within the interior space 116 and adjacent to at least one of the interior surfaces 302, 148, 150 of the sidewalls 110, 112, 114. In some examples, the base 310 may be rigidly and/or otherwise connected to at least one of the sidewalls 110, 112, 114 and/or to the bottom ring 102. Alternatively, the base 310 may be disposed within the interior space 116 without connection to any of the components of the assembly 100 described herein. In such examples, the base 310 may be disposed on and/or at least partially supported by the support surface on which the wheels 108, the bottom ring 102, and/or other components of the assembly 100 are disposed. In any of the examples described herein, the base 310 may be configured to remain stationary as the bottom ring 102, the top ring 104, the braces 106, and/or the remaining components of the assembly 100 are rotated about the longitudinal axis A and/or otherwise moved along the support surface. In this way, one or more of the items 306 disposed on the base 310 may be viewed from a variety of different angles or vantage points, via one or more of the orifices 304, without having to move such items 306. It is understood, however, that in additional embodiments, the bottom ring 102, top ring 104, braces 106, and/or other components of the assembly 100 may be configured to remain stationary and the base 310 may be configured to rotate about the longitudinal axis A and/or otherwise moved along the support surface to provide similar functionality.

In the examples described herein, the base 310 may have substantially the same composition, color, and/or other configurations of at least one of the sidewalls 110, 112, 114 and/or the top 156. For example, in some embodiments the base 310 may be substantially opaque, while in other examples, the base 310 may be semi-transparent. Additionally, the base 310 may be black or grey in color to assist in at least partially absorbing light impinging upon the base 310 and/or to otherwise provide a contrast with the items 306 disposed thereon. In other examples, on the other hand, the base 310 may be white, off-white, beige, and/or any other color to assist in dispersing such light as the light is directed to the interior space 116 and/or to assist in providing such a contrast. Further, similar to the sidewalls 110, 112, 114 described above, the base 310 may have either a substantially one-piece (e.g., single layer) construction or, alternatively, the base 310 may include two or more layers that are adhered, heat sealed, thermoformed, co-extruded, molded, and/or otherwise connected together to form a single sheet. Either such configuration may further assist the base 310 in, for example, dispersing ambient light within the interior space 116.

For example, the base 310 may be made from any durable, substantially rigid material configured to form an outer surface or an inner surface of the assembly 100. In example embodiments, one or more plastics, polymers, synthetic materials, foams, or other such material may be utilized to form the base 310, and such materials may include any of the fabrics, foams, or materials described above with respect to the sidewall 110. Additionally or alternatively, at least part of the base 310 may have a substantially corrugated, substantially fluted, and/or other configuration designed to provide greater structural rigidity than, for example, a non-corrugated or non-fluted structure made from the same material. Further, the base 310 may have any shape, size, or other configuration in order to assist in supporting items 306 disposed within the interior space 116. For example, the base 310 may be substantially circular, substantially disc-shaped, substantially square, substantially rectangular, and/or any other shape. In some examples, a substantially disc-shaped base 310 may have a diameter that is less than or substantially equal to a diameter of, for example, the bottom ring 102 and/or the top 156. Additionally, the base 310 may have a thickness that is between approximately 1/16 inch and approximately 1/2 inch, and such a thickness may be less than, greater than, or substantially equal to a thickness of at least one of the sidewalls 110, 112, 114 or the top 156. In any of the examples described herein, the base 310 may extend substantially perpendicular to the longitudinal axis A, the bottom ring 102, the top ring 104, one or more of the braces 106 and/or one or more of the sidewalls 110, 112, 114. In such examples, the base 310 may also extend substantially parallel to the top 156 and/or one or more of the supports 152.

As described above with respect to at least the sidewalls 112, 114, in some examples a top surface of the base 310 on which one or more items 306 are disposed may form at least part of the interior space 116, and the top surface of the base 310 may be configured to collimate, diffuse, reflect, refract, filter, focus, and/or otherwise condition light and/or other radiation impinging thereon. Accordingly, in some examples, the top surface of the base 310 may comprise one or more layers of semi-transparent/translucent diffusive material. Such materials may provide a desirable level of collimation, diffusion, reflection, refraction filtering, focusing, reduction, directionality, and/or other conditioning to light or other radiation within the interior space 116. Such materials may be highly reflective and, as a result, may provide adequate light conditions within the interior space 116 for capturing relatively high quality images with only a minimum amount of ambient light entering the interior space 116.

In some examples, at least one of the sidewalls 110, 112, 114 or the top 156 may also include one or more additional orifices configured to assist in passing additional ambient light to the interior space 116 via the respective at least one of the sidewalls 110, 112, 114 or the top 156. For example, as noted above, at least one of the sidewalls 110, 112, 114 may include an orifice 304 providing a line of sight G to at least part of the interior space 116. In addition to the orifice 304, at least one of the sidewalls 110, 112, 114 may include one or more additional orifices 312, 314 (illustrated with hidden lines in FIG. 3). Such additional orifices 312, 314 may increase the overall transmissivity of the respective at least one of the sidewalls 110, 112, 114 by eliminating a portion of the material making up the sidewall 110, 112, 114, thereby providing a substantially direct path for ambient light to enter the interior space 116. For example, in embodiments in which a sidewall 110, 112, 114 having one or more additional orifices 312, 314 comprises a substantially one-piece (e.g., single layer) construction, the orifice 304 may comprise a thru-hole extending entirely through the single layer sidewall 110, 112, 114. In such examples, the sidewall 110, 112, 114 having the one or more additional orifices 312, 314 may further include one or more sheets, layers, covers, or other components configured to cover at least part of the one or more additional orifices 312, 314. Such sheets, layers, covers, or other components may be made from any of the materials described above with respect to the sidewalls 110, 112, 114. In examples in which the sidewall 110, 112, 114 having one or more additional orifices 312, 314 comprises two or more layers that are adhered, heat sealed, thermoformed, co-extruded, molded, and/or otherwise connected together to form a single sheet, the one or more additional orifices 312, 314 may comprise a thru-hole extending entirely through each layer of the multi-layer sidewall 110, 12, 114. Alternatively, in such embodiments, the one or more additional orifices 312, 314 may be formed in at least one of the two or more layers forming the multi-layer sidewall 110, 112, 114. For example, the additional orifice 314 may be formed in an outer layer of the sidewall 114 forming at least part of the outer surface 146 or in an inner layer of the sidewall 114 forming at least part of the inner surface 150. Similarly, the additional orifice 312 may be formed in an outer layer of the sidewall 112 forming at least part of the outer surface 144 or in an inner layer of the sidewall 112 forming at least part of the inner surface 148.

As can be seen from the example embodiment illustrated in at least FIG. 3, during use of any of the example assemblies 100 described herein, a user may remove the top 156 of the assembly 100 in order to expose the interior space 116. With at least a portion of the interior space 116 exposed, the user may dispose one or more items 306 within the interior space 122. For example, the user may dispose an item 306 on a top surface of the base 310 forming at least part of the internal space 116 and/or otherwise facing the internal space 116. With the item 306 or items 306 positioned as desired, the user may dispose the top 156 on one or more of the supports 152 in order to substantially enclose the one or more items 306 within the interior space 116. Once configured in this way, the user may deploy one or more of the mirrors 118, 138 described herein to direct ambient light to the interior space 116 from one or more light sources 154 external to the interior space 116. In particular, the user may rotate, pivot, angle, move and/or otherwise position at least one of the mirrors 118, 138 relative to the longitudinal axis A and/or relative to at least one of the sidewalls 110, 112, 114 in order to direct a desired amount of ambient light to the interior space 116 via at least one of the sidewalls 110, 112, 114. In addition to moving at least one of the mirrors 118, 138 to increase, decrease, modify, and/or otherwise control an amount, path, direction, and/or angle of the ambient light entering the interior space 116 (e.g., in the direction of arrows D, E, F), the user may also rotate and/or otherwise move the assembly 100 using the wheels 108 to further to increase, decrease, modify, and/or otherwise control an amount, path, direction, and/or angle of the ambient light entering the interior space 116. For example, rotating and/or otherwise moving the assembly 100 in this way may change an angle at which such ambient light reflects off of at least one of the mirrors 118, 138. Accordingly, rotating and/or otherwise moving the assembly 100 in this way may change an amount, path, direction, and/or angle of the ambient light entering the interior space 116 via at least one of the sidewalls 110, 112, 114.

The user may capture one or more images of the item 306, via one or more of the orifices 304 of the assembly 100, using the imaging device 308. The user may capture one or more additional images of the item 306 by rotating and/or otherwise moving the assembly 100 using the wheels 108. In some examples, the base 310 and/or the item 306 may remain stationary relative to the sidewalls 110, 112, 114 and/or other components of the assembly 100 while the user rotates and/or otherwise moves the assembly 100. As a result, the user may obtain images of the item 306 at any vantage point (e.g., at any radial location 360 degrees about the longitudinal axis A), via the orifice 304, without repositioning the item 306. Such functionality may be advantageous at least for relatively fragile items 306 and/or for a collection of items 306 disposed within the interior space 116. Such functionality may also advantageously reduce the amount of time required for the user to capture images of the one or more items 306 from different vantage points.

Further, the example embodiments of the assembly 100 described herein may be configured to provide near studio-quality light dimensionality and, thus, may facilitate obtaining relatively high quality digital images of objects disposed within the interior space 116, without the use of light sources connected to the assembly 100 and/or without connecting the assembly 100 to any external power source. For example, one or more of the sidewalls 110, 112, 114, top 156, base 310 and/or other components of the assembly 110, such as various inner surfaces of these components, may facilitate obtaining substantially shadow-free images with minimal specularity and using only ambient light entering the interior space 116 from one or more external light sources 154. Additionally, the one or more mirrors 118, 138 of the assembly 100 may be positioned and/or otherwise manipulated by the user to provide directional accent illumination while the images are being captured. Such directional accent illumination or "fill" illumination may, for example, provide front and/or side reflection during image capture sessions and may add softness, sharpness, or other desired dramatic effects to the captured image. In this way, such directional accent illumination may improve the overall quality of the image obtained using the assembly 100. In some examples, such accent illumination may also assist in substantially eliminating shadows in the captured images. Further, since assemblies 100 of the present disclosure may enable the capture of such high quality images without having dedicated light assemblies and without the need for connection to an external power source, the cost, manufacturing complexity, and assembly time associated with such assemblies 100 may be advantageously reduced relative to known image capture assemblies, while improving system reliability.

Accordingly, the example assemblies and methods of the present disclosure offer unique and heretofore unworkable approaches to digital imaging. Such assemblies and methods simplify the process of obtaining high quality images and, thus, improve user satisfaction.

CONCLUSION

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. An image capture assembly, comprising:
   an annular top ring;
   an annular bottom ring;
   a first brace connected to the top and bottom rings;
   a second brace connected to the top and bottom rings; the first and second braces spacing the top ring from the bottom ring along a longitudinal axis extending substantially centrally through the top and bottom rings;
   a first semi-transparent sidewall extending from the top ring to the bottom ring and defining at least a first part of a substantially enclosed interior space of the assembly;
   a second substantially opaque curved sidewall extending from the top ring to the bottom ring, the second sidewall defining at least a second part of the interior space; and
   a mirror disposed external to the interior space and opposite the first sidewall, the mirror being moveably connected to at least one of the first brace, the top ring, or the bottom ring, the mirror being configured to direct ambient light to the interior space via the first sidewall.

2. The assembly of claim 1, further comprising a plurality of wheels, each wheel of the plurality of wheels being connected to one of the bottom ring, the first brace, or the second brace, the plurality of wheels enabling rotation of the assembly about the longitudinal axis when the assembly is disposed on a support surface.

3. The assembly of claim 1, wherein the mirror further comprises a substantially rigid frame, the assembly further comprising an arm extending from the frame and connected to the at least one of the first brace, the top ring, or the bottom ring.

4. The assembly of claim 1, further comprising a third semi-transparent sidewall opposite the first sidewall, the third sidewall extending from the top ring to the bottom ring and defining a third part of the interior space, at least one of the first sidewall or the third sidewall comprising an orifice providing a line of sight to the interior space from a location external to the interior space.

5. The assembly of claim 4, further comprising an additional mirror external to the interior space and opposite the third sidewall, the additional mirror being moveable relative to the third sidewall and configured to direct ambient light to the interior space via the third sidewall.

6. An assembly, comprising:
   a frame including a top ring and a bottom ring opposite the top ring;
   a first curved sidewall extending along at least part of the frame and defining at least a first part of an interior space of the assembly, the first sidewall including an orifice providing a line of sight to the interior space from a location external to the interior space;

a second sidewall opposite the first sidewall, the second sidewall extending from the top ring to the bottom ring and defining at least a second part of the interior space;

a third substantially opaque curved sidewall, the third sidewall defining at least a third part of the interior space; and a mirror disposed external to the interior space, the mirror being moveable relative to the first sidewall and configured to direct ambient light to the interior space via the first sidewall.

7. The assembly of claim 6, wherein the first sidewall comprises a semi-transparent diffusive material.

8. The assembly of claim 6, wherein the second and third sidewalls extend along respective parts of the frame.

9. The assembly of claim 8, further comprising an additional mirror external to the interior space and opposite the second sidewall, the additional mirror being moveable relative to the second sidewall and configured to direct ambient light to the interior space via the second sidewall.

10. The assembly of claim 6, wherein the frame comprises a brace connected to the top ring and connected to the bottom ring, the brace spacing the top ring from the bottom ring.

11. The assembly of claim 6, further comprising a plurality of wheels enabling rotation of the assembly about a longitudinal axis of the assembly when the assembly is disposed on a support surface.

12. The assembly of claim 6, further comprising a substantially circular base disposed adjacent to the first sidewall, the base defining at least an additional part of the interior space and being configured to remain stationary while the assembly is rotated about the base, the base having an outer perimeter disposed within the interior space.

13. The assembly of claim 6, further comprising a semi-transparent top extending substantially perpendicular to a central longitudinal axis of the assembly, the top being positionable to diffuse ambient light entering the interior space.

14. The assembly of claim 6, wherein the second sidewall is disposed between the mirror and the orifice of the first sidewall.

15. The assembly of claim 6, wherein the first sidewall comprises a first substantially rigid layer, and a second layer of semi-transparent diffusive material overlaying at least part of the first layer, the first layer forming the orifice at a location opposite the mirror, and the second layer covering at least a portion of the orifice.

16. The assembly of claim 6, wherein the mirror comprises a substantially rigid frame, and wherein the frame of the mirror is movably connected to the assembly via an arm extending from the frame of the mirror to the frame of the assembly.

17. A method of manufacturing an image capture assembly, comprising:

connecting an annular top ring to a brace such that the brace extends substantially perpendicularly from the top ring;

connecting a bottom ring to the brace such that the bottom ring extends substantially parallel to the top ring and the brace spaces the top ring from the bottom ring;

connecting a first curved sidewall to at least one of the top ring, the bottom ring, or the brace, the first sidewall extending from the top ring to the bottom ring and defining at least a first part of an interior space of the assembly;

connecting a second substantially opaque curved sidewall to at least one of the top ring, the bottom ring, or the brace, the second sidewall extending from the top ring to the bottom ring and defining at least a second part of the interior space; and connecting a mirror to at least one of the top ring, the bottom ring, or the brace, wherein the mirror is disposed external to the interior space, moveable relative to the first sidewall, and configured to direct ambient light to the interior space via the first sidewall.

18. The method of claim 17, further comprising connecting a plurality of wheels to the assembly, wherein each wheel of the plurality of wheels is connected to one of the bottom ring or the brace, the plurality of wheels enabling rotation of the assembly about a longitudinal axis of the assembly when the assembly is disposed on a substantially planar support surface.

19. The method of claim 17, further comprising:

connecting a third semi-transparent curved sidewall to at least one of the top ring, the bottom ring, or the brace, the third sidewall extending from the top ring to the bottom ring, wherein the third sidewall defining at least a third part of the interior space.

20. The method of claim 19, further comprising connecting an additional mirror to at least one of the top ring, the bottom ring, or the brace, wherein the additional mirror is:

disposed external to the interior space opposite the third sidewall, moveable relative to the third sidewall, and configured to direct ambient light to the interior space via the third sidewall.

21. An assembly, comprising:

a frame;

a curved sidewall extending along at least part of the frame and defining at least part of an interior space of the assembly, the sidewall including an orifice providing a line of sight to the interior space from a location external to the interior space; and a mirror disposed external to the interior space, the mirror being moveable relative to the sidewall and configured to direct ambient light to the interior space via the sidewall, wherein the sidewall comprises a first substantially rigid layer, and a second layer of semi-transparent diffusive material overlaying at least part of the first layer, the first layer forming the orifice at a location opposite the mirror, and the second layer covering at least a portion of the orifice.

* * * * *